US012638552B2

(12) United States Patent
Tong et al.

(10) Patent No.: US 12,638,552 B2
(45) Date of Patent: May 26, 2026

(54) ELECTRONIC DEVICE, METHOD FOR CONTROLLING ELECTRONIC DEVICE, AND PROGRAM

(71) Applicant: KYOCERA Corporation, Kyoto (JP)

(72) Inventors: Fangwei Tong, Machida (JP); Tooru Sahara, Yokohama (JP); Takuya Homma, Yokohama (JP); Jun Kuroda, Kodaira (JP); Kenji Yamamoto, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 472 days.

(21) Appl. No.: 18/247,851

(22) PCT Filed: Oct. 4, 2021

(86) PCT No.: PCT/JP2021/036659

§ 371 (c)(1),
(2) Date: Apr. 4, 2023

(87) PCT Pub. No.: WO2022/091706

PCT Pub. Date: May 5, 2022

(65) Prior Publication Data

US 2023/0400553 A1      Dec. 14, 2023

(30) Foreign Application Priority Data

Oct. 28, 2020    (JP) ................................. 2020-180876

(51) Int. Cl.
G01S 7/41 (2006.01)
G01S 13/04 (2006.01)
(Continued)

(52) U.S. Cl.
CPC .............. G01S 7/417 (2013.01); G01S 13/04 (2013.01); G01S 13/42 (2013.01); G01S 13/931 (2013.01)

(58) Field of Classification Search
CPC ............ G01S 7/411; G01S 7/417; G01S 7/41; G01S 7/4802; G01S 7/52036;
(Continued)

(56) References Cited

U.S. PATENT DOCUMENTS 6,278,401 B1 * 8/2001 Wigren ................... G01S 3/325
342/115
7,289,060 B1 * 10/2007 Abatzoglou ............ G01S 7/412
342/25 R
(Continued)

FOREIGN PATENT DOCUMENTS

EP          2095296 B1     1/2014
JP      H05-059372 U     8/1993
(Continued)

*Primary Examiner* — Michael W Justice
(74) *Attorney, Agent, or Firm* — Studebaker Brackett PLLC

(57) ABSTRACT

An electronic device includes a transmission antenna, a reception antenna, and a signal processor. The transmission antenna is configured to transmit a transmission wave. The reception antenna is configured to receive a reflection wave resulting from reflection of the transmission wave. The signal processor is configured to detect an object based on a transmission signal transmitted as the transmission wave and a reception signal received as the reflection wave. The signal processor classifies a point group representing the object in accordance with a prescribed parameter when performing clustering on detection results of the object.

13 Claims, 12 Drawing Sheets

(51) Int. Cl.
    *G01S 13/42*        (2006.01)
    *G01S 13/931*      (2020.01)

(58) Field of Classification Search
    CPC ........ G01S 7/539; G06V 10/26; G06V 20/41;
            G06V 20/49; G06V 30/15; G06V 30/191;
                                    G06V 30/191107
    USPC .................................................. 342/195, 192
    See application file for complete search history.

(56)               References Cited

U.S. PATENT DOCUMENTS

| | | | | |
|---|---|---|---|---|
| 7,609,887 | B2 * | 10/2009 | Liang | G06V 10/267 |
| | | | | 382/164 |
| 8,175,374 | B2 * | 5/2012 | Pinault | G06V 20/64 |
| | | | | 382/154 |
| 9,599,706 | B2 * | 3/2017 | Zeng | G01S 13/931 |
| 9,784,829 | B2 * | 10/2017 | Zeng | G01S 13/878 |
| 9,904,859 | B2 * | 2/2018 | Grauer | H04N 23/62 |
| 10,026,012 | B2 * | 7/2018 | Zhu | G06F 18/22 |
| 10,338,223 | B1 * | 7/2019 | England | G01S 7/40 |
| 10,444,759 | B2 | 10/2019 | Douillard et al. | |
| 10,502,832 | B2 * | 12/2019 | Tehrani Niknejad | G01S 17/42 |
| 10,679,099 | B2 * | 6/2020 | Kehl | G06N 3/0464 |
| 10,754,021 | B2 * | 8/2020 | Baheti | G01S 13/62 |
| 10,871,776 | B2 * | 12/2020 | Borkowski | G01S 7/4808 |
| 11,295,119 | B2 * | 4/2022 | Andreou | G01S 7/539 |
| 11,403,482 | B2 * | 8/2022 | Li | G06V 10/763 |
| 11,435,443 | B2 * | 9/2022 | Santra | G01S 13/723 |
| 11,495,125 | B2 * | 11/2022 | Zhang | G08G 1/0125 |
| 11,507,092 | B2 * | 11/2022 | Mostajeran | G01S 7/411 |
| 11,907,846 | B2 * | 2/2024 | Liu | G06F 18/22 |
| 2005/0271276 | A1 * | 12/2005 | Liang | G06T 7/0012 |
| | | | | 382/195 |
| 2007/0013580 | A1 * | 1/2007 | Finch | G01S 13/5246 |
| | | | | 342/194 |
| 2010/0208035 | A1 * | 8/2010 | Pinault | G06V 40/10 |
| | | | | 348/46 |
| 2016/0252617 | A1 * | 9/2016 | Tehrani Niknejad | |
| | | | | G01S 7/4808 |
| | | | | 356/5.01 |
| 2016/0291145 | A1 * | 10/2016 | Zeng | G01S 7/415 |
| 2016/0291149 | A1 * | 10/2016 | Zeng | G01S 13/874 |
| 2017/0091586 | A1 * | 3/2017 | Zhu | G06V 40/103 |
| 2017/0270375 | A1 * | 9/2017 | Grauer | G06V 10/60 |
| 2019/0079193 | A1 * | 3/2019 | Gunnam | G01S 17/10 |
| 2019/0101634 | A1 * | 4/2019 | Baheti | G01S 7/415 |
| 2019/0302771 | A1 * | 10/2019 | Borkowski | G01S 13/931 |
| 2019/0347515 | A1 * | 11/2019 | Kehl | G06N 3/0464 |
| 2020/0160046 | A1 * | 5/2020 | Andreou | G01S 7/539 |
| 2020/0279478 | A1 * | 9/2020 | Zhang | G08G 1/0129 |
| 2021/0116540 | A1 * | 4/2021 | Santra | G01S 13/34 |
| 2021/0200209 | A1 * | 7/2021 | Mostajeran | G01S 13/931 |
| 2021/0216814 | A1 * | 7/2021 | Li | G06V 10/763 |
| 2022/0076128 | A1 * | 3/2022 | Liu | G06V 10/82 |
| 2022/0206154 | A1 * | 6/2022 | Kotov | G01S 7/499 |
| 2024/0175984 | A1 * | 5/2024 | Kato | G01S 17/93 |

FOREIGN PATENT DOCUMENTS

| | | | |
|---|---|---|---|
| JP | 2010-525432 | A | 7/2010 |
| JP | 2019-185347 | A | 10/2019 |
| WO | 2014/069633 | A1 | 5/2014 |

* cited by examiner

SUB FRAME 1

⋮

SUB FRAME N

ELECTRONIC DEVICE, METHOD FOR CONTROLLING ELECTRONIC DEVICE, AND PROGRAM

CROSS-REFERENCE TO RELATED APPLICATIONS

This application claims priority of Japanese Patent Application No. 2020-180876 filed in Japan on Oct. 28, 2020, the entire disclosure of which is hereby incorporated by reference.

TECHNICAL FIELD

The present disclosure relates to an electronic device, a method for controlling an electronic device, and a program.

BACKGROUND OF INVENTION

In fields such as industries related to automobiles, for example, technologies for measuring the distance between a host vehicle and a prescribed object are becoming increasingly important. In particular, in recent years, various studies have been conducted on radar (radio detecting and ranging ((RADAR)) technologies. In these technologies, the distance to an object is measured by transmitting radio waves, such as millimeter waves, and receiving waves reflected from an object, such as an obstacle. The importance of such technologies for measuring distances so forth is expected to further increase in the future with the development of technologies for assisting drivers in driving and technologies related to automated driving that allow part or all of the driving process to be automated.

In technologies such as radar described above, various clustering methods are known as algorithms for determining whether or not an object has been detected based on a reception signal. For example, Patent Literature 1 proposes clustering with which target identification can be performed with good accuracy. Density-based spatial clustering of applications with noise (DBSCAN) is widely used as an algorithm for clustering data in accordance with density. When making a determination for object detection, it is assumed that if clustering is not performed properly, objects cannot be detected well.

CITATION LIST

Patent Literature

Patent Literature 1: Japanese Unexamined Utility Model Registration Application Publication No. 5-59372

SUMMARY

In an embodiment, an electronic device includes a transmission antenna, a reception antenna, and a signal processor.

The transmission antenna is configured to transmit a transmission wave.

The reception antenna is configured to receive a reflection wave resulting from reflection of the transmission wave.

The signal processor is configured to detect an object based on a transmission signal transmitted as the transmission wave and a reception signal received as the reflection wave.

The signal processor classifies a point group representing the object in accordance with a prescribed parameter when performing clustering on detection results of the object.

In an embodiment, a method of controlling an electronic device includes:

transmitting a transmission wave using a transmission antenna;

receiving a reflection wave generated by reflection of the transmission wave using a reception antenna;

detecting an object based on a transmission signal transmitted as the transmission wave and a reception signal received as the reflection wave, and classifying a point group representing the object in accordance with a prescribed parameter when performing clustering on detection results of the object.

In an embodiment, provided is a program for causing a computer to execute:

transmitting a transmission wave using a transmission antenna;

receiving a reflection wave generated by reflection of the transmission wave using a reception antenna;

detecting an object based on a transmission signal transmitted as the transmission wave and a reception signal received as the reflection wave, and classifying a point group representing the object in accordance with a prescribed parameter when performing clustering on detection results of the object.

DESCRIPTION OF EMBODIMENTS

Figure 1:
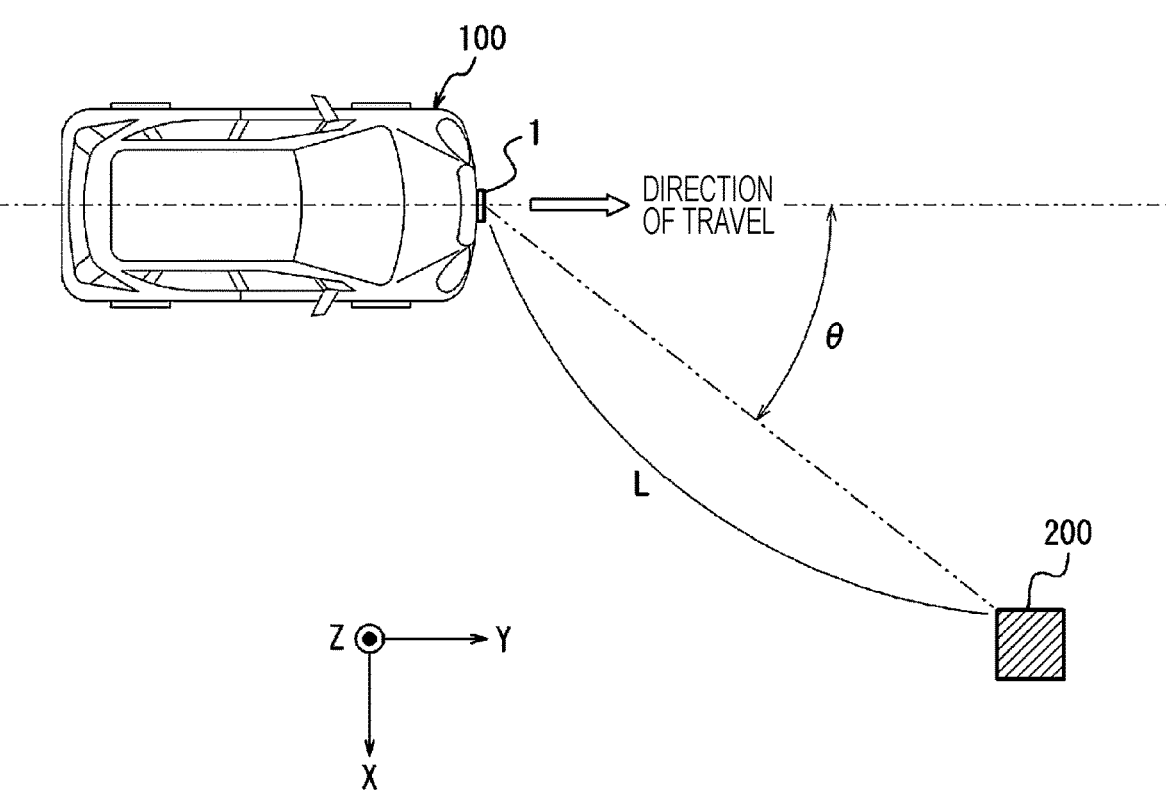
FIG. 1 is a diagram for explaining the way in which an electronic device according to an embodiment is used.

A technology for detecting a prescribed object well by receiving a reflection wave generated as a result of a transmitted transmission wave being reflected by the prescribed object is desirable. An object of the present disclosure is to provide an electronic device, a method of controlling an electronic device, and a program that can detect an object well. According to an embodiment, an electronic device, a method of controlling an electronic device, and a program with which objects can be well detected can be provided. Hereafter, an embodiment will be described in detail while referring to the drawings.

An electronic device according to an embodiment is installed in a vehicle (mobile object) such as an automobile and is capable of detecting a prescribed object located in the surroundings of the mobile object as a target. Accordingly, the electronic device according to the embodiment can transmit a transmission wave into the surroundings of the mobile object from a transmission antenna installed in the mobile object. In addition, the electronic device according to the embodiment can receive a reflection wave from a reception antenna installed in the mobile object, the reflection wave being generated by the transmission wave being reflected. At least one out of the transmission antenna and the reception antenna may be, for example, provided in a radar sensor or the like installed in the mobile object.

Hereinafter, as a typical example, a configuration will be described in which the electronic device according to the embodiment is mounted in an automobile such as a passenger vehicle. However, the electronic device according to the embodiment is not limited to being mounted in an automobile. The electronic device of the embodiment may be mounted in any of a variety of mobile objects such as self-driving cars, buses, taxis, trucks, taxis, motorcycles, bicycles, ships, aircraft, helicopters, agricultural equipment such as tractors, snowplows, sweepers, police cars, ambulances, and drones. Furthermore, the electronic device according to the embodiment is not necessarily limited to being mounted in mobile objects that move under their own power. For example, the mobile object in which the electronic device according to the embodiment is mounted may be a trailer part towed by a tractor. The electronic device according to the embodiment can measure the distance or the like between a sensor and a prescribed object in a situation where at least one out of the sensor and the object can move. The electronic device according to the embodiment can measure the distance or the like between the sensor and the object even when both the sensor and the object are stationary. Automobiles included in the present disclosure are not limited by overall length, width, height, displacement, capacity, or load capacity. For example, automobiles of the present disclosure also include automobiles having a displacement greater than 660 cc, and automobiles having a displacement less than or equal to 660 cc, i.e., so-called light automobiles. Automobiles included in the present disclosure also include automobiles that use electricity as part or all of their energy and utilize motors.

Configuration of Electronic Device According to Embodiment

First, an example of detection of an object performed by the electronic device according to the embodiment will be described.

FIG. 1 is a diagram for explaining the way in which the electronic device according to the embodiment is used. FIG. 1 illustrates an example in which the electronic device according to the embodiment is installed in a mobile object, the electronic device being equipped with a transmission antenna and a reception antenna.

An electronic device 1 according to the embodiment is installed in a mobile object 100 illustrated in FIG. 1. The electronic device 1 includes a transmission antenna and a reception antenna. The electronic device 1 according to the embodiment may be mounted in (for example, built into) the mobile object 100 illustrated in FIG. 1. The specific configuration of the electronic device 1 will be described below. As described below, the electronic device 1 may include, for example, at least one out of a transmission antenna and a reception antenna. The mobile object 100 illustrated in FIG. 1 may be a vehicle such as an automobile like a passenger car, but may be any suitable type of mobile object. In FIG. 1, the mobile object 100 may, for example, be moving (traveling or slowing down) in the positive Y-axis direction (direction of travel) indicated in the figure, may be moving in another direction, or may be stationary and not moving.

As illustrated in FIG. 1, the electronic device 1 including a transmission antenna is installed in the mobile object 100. In the example illustrated in FIG. 1, only one electronic device 1, which includes a transmission antenna and a reception antenna, is installed at the front of the mobile object 100. The position where the electronic device 1 is installed on or in the mobile object 100 is not limited to the position illustrated in FIG. 1, and may be another position, as appropriate. For example, the electronic device 1 illustrated in FIG. 1 may be installed at the left side, the right side, and/or the rear of the mobile object 100. The number of electronic devices 1 may be any suitable number of one or more depending on various conditions (or requirements) such as the range and/or accuracy of measurement in the mobile object 100. The electronic device 1 may be installed inside the mobile object 100. The inside of the mobile object 100 may be, for example, the space inside a bumper, the space inside the body, the space inside a headlight, or the driver's space.

The electronic device 1 transmits an electromagnetic wave as a transmission wave from the transmission antenna. For example, when there is a prescribed object (for example, an object 200 illustrated in FIG. 1) in the surroundings of the mobile object 100, at least part of a transmission wave transmitted from the electronic device 1 will be reflected by the object and become a reflection wave. The reflection wave is, for example, received by the reception antenna of the electronic device 1, and in this way, the electronic device 1 installed in the mobile object 100 is able to detect the object as a target.

The electronic device 1 including the transmission antenna may typically be a radar (radio detecting and ranging (RADAR)) sensor that transmits and receives radio waves. However, the electronic device 1 is not limited to being a radar sensor. The electronic device 1 according to the embodiment may be a sensor based on light detection and ranging or laser imaging detection and ranging (LIDAR) technologies utilizing light waves. These kind of sensors may include patch antennas, for example. Since technologies such as RADAR and LIDAR are already well known, more detailed description thereof may be simplified or omitted as appropriate.

The electronic device 1 installed in the mobile object 100 illustrated in FIG. 1 receives, from the reception antenna, a reflection wave generated from a transmission wave transmitted from the transmission antenna. In this way, the electronic device 1 can detect the prescribed object 200 existing within a prescribed distance from the mobile object 100 as a target. For example, as illustrated in FIG. 1, the electronic device 1 can measure a distance L between the mobile object 100, which is the host vehicle, and the prescribed object 200. The electronic device 1 can also measure the relative speed of the mobile object 100, which is the host vehicle, and the prescribed object 200. The electronic device 1 can also measure the direction (arrival angle θ) in which the reflection wave reflected from the prescribed object 200 arrives at the mobile object 100, which is the host vehicle.

The object 200 may be at least one out of, for example, an oncoming vehicle traveling in a lane adjacent to the mobile object 100, a car traveling next to the mobile object 100, and vehicles in front of and behind and traveling in the same lane as the mobile object 100. The object 200 may be any object that exists around the mobile object 100 such as a motorcycle, a bicycle, a stroller, a person such as a pedestrian, a living organism such as an animal or an insect, a guardrail, a median strip, a road sign, a sidewalk step, a wall, a manhole, or an obstacle. In addition, the object 200 may be in motion or stationary. For example, the object 200 may be an automobile that is parked or stationary in the surroundings of the mobile object 100.

In FIG. 1, the ratio of the size of the electronic device 1 to the size of the mobile object 100 does not necessarily represent the actual ratio. In FIG. 1, a state is illustrated in which the electronic device 1 is installed on the outside of the mobile object 100. However, in an embodiment, the electronic device 1 may be installed at any of various positions on or in the mobile object 100. For example, in an embodiment, the electronic device 1 may be installed inside a bumper of the mobile object 100 so that the electronic device 1 does not appear outside the mobile object 100.

Hereinafter, as a typical example, the transmission antenna of the electronic device 1 will be described as transmitting radio waves in a frequency band such as a millimeter wave band (greater than or equal to 30 GHz) or a quasi-millimeter wave band (for example, around 20 GHz to 30 GHz). For example, the transmission antenna of a sensor 5 may transmit radio waves with a frequency bandwidth of 4 GHz, such as from 77 GHz to 81 GHz.

Figure 2:
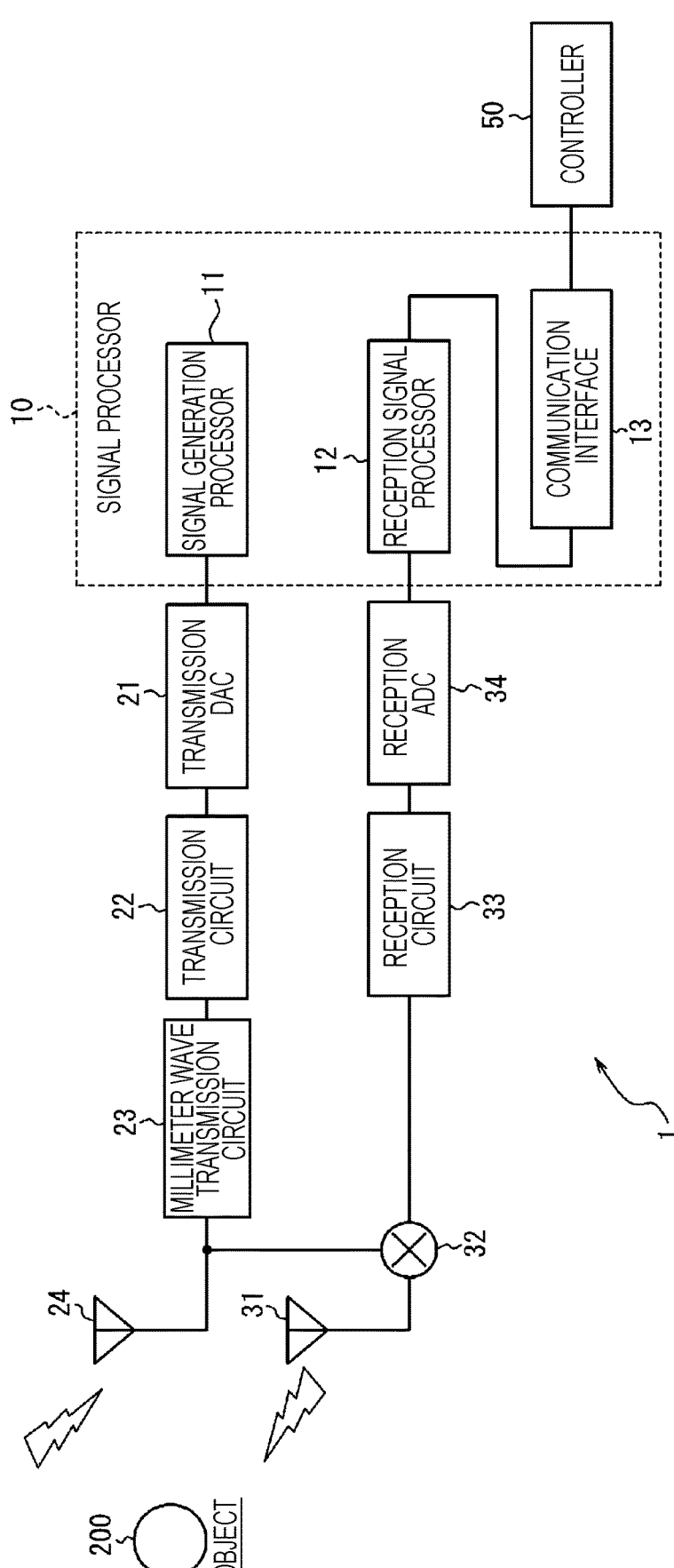
FIG. 2 is a functional block diagram schematically illustrating the configuration of the electronic device according to the embodiment.

FIG. 2 is a functional block diagram schematically illustrating an example configuration of the electronic device 1 according to the embodiment. Hereafter, an example of the configuration of the electronic device 1 according to the embodiment will be described.

Frequency-modulated continuous wave radar (hereinafter referred to as FMCW radar) is often used to measure distances using millimeter-wave radar. In FMCW radar, the transmission signal is generated by sweeping the frequency of the radio waves to be transmitted. Therefore, for example, in a millimeter-wave FMCW radar that uses radio waves in the 79 GHz frequency band, the frequency of the radio waves being used will have a frequency bandwidth of 4 GHz, for example, from 77 GHz to 81 GHz. Radar in the 79 GHz frequency band is characterized by having a wider usable frequency bandwidth than other millimeter/quasi-millimeter wave radars, for example, in the 24 GHz, 60 GHz, and 76 GHz frequency bands. Hereafter, such an embodiment will be described as an example.

As illustrated in FIG. 2, the electronic device 1 according to the embodiment includes a signal processor 10. The signal processor 10 may include a signal generation processor 11, a reception signal processor 12, and a communication interface 13. The electronic device 1 according to the embodiment includes a transmission DAC 21, a transmission circuit 22, a millimeter wave transmission circuit 23, and a transmission antenna array 24 as a transmission section. The electronic device 1 according to the embodiment further includes a reception antenna array 31, a mixer 32, a reception circuit 33, and a reception ADC 34 as a reception section. The electronic device 1 according to the embodiment need not include all of the functional units illustrated in FIG. 2 and may include functional units other than those illustrated in FIG. 2. The electronic device 1 illustrated in FIG. 2 may be configured using circuits that are basically the same as those used in general radars that use electromagnetic waves in the millimeter wave band or the like. However, in the electronic device 1 according to the embodiment, signal processing performed by the signal processor 10 includes processing that differs from that performed by general radars of the related art.

The signal processor 10 of the electronic device 1 according to the embodiment can control overall operation of the electronic device 1 including control of each functional unit constituting the electronic device 1. In particular, the signal processor 10 performs various types of processing on the signals handled by electronic device 1. The signal processor 10 may include at least one processor, such as a central processing unit (CPU) or a digital signal processor (DSP), in order to provide control and processing power to perform various functions. The signal processor 10 may be implemented collectively in a single processor, in several processors, or in individual processors. The processors may be implemented as a single integrated circuit. An integrated circuit may also be referred to as an IC. Processors may be implemented as multiple integrated circuits and discrete circuits connected so as to be able to communicate with each other. The processors may be realized based on various other known technologies. In the embodiment, the signal processor 10 may be configured, for example, as a CPU (hardware) and a program (software) executed by the CPU. The signal processor 10 may appropriately include a memory as needed for the operation of signal processor 10.

The signal generation processor 11 of the signal processor 10 generates a signal to be transmitted from the electronic device 1. In the electronic device 1 according to the embodiment, the signal generation processor 11 may generate a transmission signal such as a chirp signal (transmission chirp signal). In particular, the signal generation processor 11 may generate a signal having a frequency that varies periodically and linearly (linear chirp signal). For example, the signal generation processor 11 may generate a chirp signal whose frequency periodically and linearly increases from 77 GHz to 81 GHz over time. For example, the signal generation processor 11 may generate a signal whose frequency periodically repeatedly linearly increases (up chirp) and decreases (down chirp) from 77 GHz to 81 GHz over time. The signal generated by the signal generation processor 11 may be set in advance in the signal processor 10, for example. The signal generated by the signal generation processor 11 may be stored in advance in a storage of the signal processor 10, for example. Since chirp signals used in technical fields such as radar are known, detailed description thereof will be simplified or omitted as appropriate. The signal generated by the signal generation processor 11 is supplied to the transmission DAC 21. Therefore, the signal generation processor 11 may be connected to the transmission DAC 21.

The transmission digital-to-analog converter (DAC) 21 has a function of converting a digital signal supplied from the signal generation processor 11 into an analog signal. The transmission DAC 21 may include a general analog-to-digital converter. The signal generated by the analog conversion performed by the transmission DAC 21 is supplied to the transmission circuit 22. Therefore, the transmission DAC 21 may be connected to the transmission circuit 22.

The transmission circuit 22 has a function of converting the signal produced by the analog conversion performed by the transmission DAC 21 into a signal of an intermediate frequency (IF) band. The transmission circuit 22 may include a general IF band transmission circuit. A signal produced by processing performed by the transmission circuit 22 is supplied to the millimeter wave transmission circuit 23. Therefore, the transmission circuit 22 may be connected to the millimeter wave transmission circuit 23.

The millimeter wave transmission circuit 23 has a function of transmitting a signal produced by processing performed by the transmission circuit 22 as a millimeter wave (RF wave). The millimeter wave transmission circuit 23 may include a general millimeter wave transmission circuit. The signal produced by processing performed by the millimeter wave transmission circuit 23 is supplied to the transmission antenna array 24. Therefore, the millimeter wave transmission circuit 23 may be connected to the transmission antenna array 24. The signal produced by the processing performed by the millimeter wave transmission circuit 23 is also supplied to the mixer 32. Therefore, the millimeter wave transmission circuit 23 may also be connected to the mixer 32.

The transmission antenna array 24 is configured by arranging multiple transmission antennas in an array pattern. In FIG. 2, the configuration of the transmission antenna array 24 is illustrated in a simplified manner. The transmission antenna array 24 transmits the signal produced by processing performed by the millimeter wave transmission circuit 23 to outside the electronic device 1. The transmission antenna array 24 may include a transmission antenna array used in a general millimeter-wave radar.

Thus, the electronic device 1 according to the embodiment includes the transmission antenna array 24 and can transmit a transmission signal (for example, a transmission chirp signal) as a transmission wave from the transmission antenna array 24.

For example, as illustrated in FIG. 2, a case in which the object 200 exists in the surroundings of the electronic device 1 is assumed. In this case, at least part of the transmission wave transmitted from the transmission antenna array 24 is reflected by the object 200. At least part of the wave reflected by object 200 out of the transmission wave transmitted from the transmission antenna array 24 may be reflected towards the reception antenna array 31.

The reception antenna array 31 receives the reflection wave. Here, the reflection wave may be at least part of the wave reflected by the object 200 out of the transmission wave transmitted from the transmission antenna array 24.

The reception antenna array 31 is configured by arranging multiple reception antennas in an array pattern. In FIG. 2, the configuration of the reception antenna array 31 is illustrated in a simplified manner. The reception antenna array 31 receives a reflection wave resulting from reflection of the transmission wave transmitted from the transmission antenna array 24. The reception antenna array 31 may include a reception antenna array used in a typical millimeter-wave radar. The reception antenna array 31 supplies a reception signal received as a reflection wave to the mixer 32. Therefore, the reception antenna array 31 may be connected to the mixer 32.

The mixer 32 converts the signal produced by processing performed by millimeter wave transmission circuit 23 (transmission signal) and the reception signal received by reception antenna array 31 into a signal of an intermediate frequency (IF) bandwidth. The mixer 32 may include a mixer used in a general millimeter wave radar. The mixer 32 supplies the resulting combined signal to the reception circuit 33. Therefore, the mixer 32 may be connected to the reception circuit 33.

The reception circuit 33 has a function of analog processing the signal converted to an IF band by the mixer 32. The reception circuit 33 may include a typical reception circuit that converts a signal into an IF band. A signal produced by processing performed by the reception circuit 33 is supplied to the reception ADC 34. Therefore, the reception circuit 33 may be connected to the reception ADC 34.

The reception analog-to-digital converter (ADC) 34 has a function of converting the analog signal supplied from the reception circuit 33 into a digital signal. The reception ADC 34 may include a general analog-to-digital converter. A signal digitized by the reception ADC 34 is supplied to the reception signal processor 12 of the signal processor 10. Therefore, the reception ADC 34 may be connected to the signal processor 10.

The reception signal processor 12 of the signal processor 10 has a function of performing various types of processing on a digital signal supplied from the reception DAC 34. For example, the reception signal processor 12 calculates the distance from the electronic device 1 to the object 200 (distance measurement) based on the digital signal supplied from the reception DAC 34. The reception signal processor 12 calculates the velocity of the object 200 relative to the electronic device 1 (velocity measurement) based on the digital signal supplied from the reception DAC 34. The reception signal processor 12 calculates the azimuth angle of the object 200 as seen from the electronic device 1 (angle measurement) based on the digital signal supplied from the reception DAC 34. Specifically, UQ converted data may be input to the reception signal processor 12. In response to input of the data, the reception signal processor 12 performs a fast Fourier transform (2D-FFT) in distance (Range) and velocity (Velocity) directions, respectively. After that, the reception signal processor 12 suppresses false alarms and makes the probability of false alarms constant by removing noise points through, for example, universal asynchronous receiver transmitter (UART) and/or constant false alarm rate (CFAR) processing. The reception signal processor 12 then obtains the position of the object 200 by, for example, performing arrival angle estimation for a point that satisfies the CFAR criteria. The information generated as a result of the distance, velocity, and angle measurements performed by reception signal processor 12 is supplied to communication interface 13.

The communication interface 13 of the signal processor 10 includes an interface that outputs information from the signal processor 10, for example, to an external controller 50. The communication interface 13 outputs information on at least any one of the position, velocity, and angle of the object 200, for example, as a controller area network (CAN) signal to outside the signal processor 10. Information on at least any one of the position, velocity, and angle of the object 200 is supplied to the controller 50 via the communication interface 13. Therefore, the communication interface 13 may be connected to the signal processor 10.

As illustrated in FIG. 2, the electronic device 1 according to the embodiment may be connected to the controller 50, for example, an electronic control unit (ECU), in a wireless or wired manner. The controller 50 controls various operations of the mobile object 100. The controller 50 may consist of at least one ECU.

Figure 3:
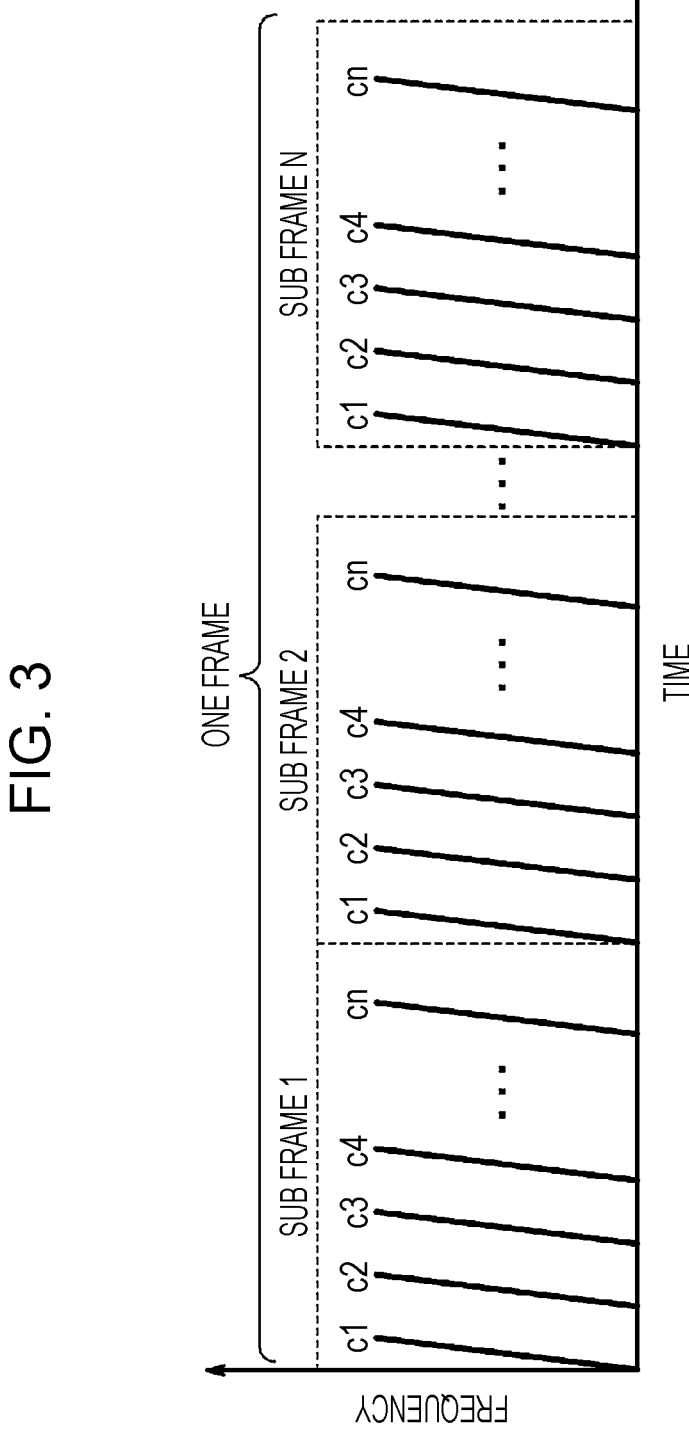
FIG. 3 is a diagram for describing the configuration of a signal processed by the electronic device according to the embodiment.

FIG. 3 is a diagram for explaining an example of chirp signals generated by the signal generation processor 11 of the signal processor 10.

FIG. 3 illustrates the temporal structure of one frame when a fast-chirp modulation (FCM) method is used. FIG. 3 illustrates an example of a reception signal of an FCM method. FCM is a method in which chirp signals, represented in FIG. 3 as c1, c2, c3, c4, . . . , cn, are repeated at short intervals (for example, greater than or equal to the round trip time between the radar and the object target for electromagnetic waves calculated from the maximum measurement distance). In FCM, for convenience of signal processing of reception signals, transmission and reception processing is often performed by dividing a signal into sub frame units as illustrated in FIG. 3.

In FIG. 3, the horizontal axis represents the passage of time and the vertical axis represents frequency. In the example illustrated in FIG. 3, the signal generation processor 11 generates linear chirp signals whose frequency varies periodically and linearly. In FIG. 3, the chirp signals are illustrated as c1, c2, c3, c4, . . . , cn. As illustrated in FIG. 3, in each chirp signal, the frequency increases linearly with time.

In the example illustrated in FIG. 3, several chirp signals are included illustrated as c1, c2, c3, c4, . . . , cn and make up one sub frame. That is, sub frame 1, sub frame 2, and so on illustrated in FIG. 3 are each composed of several chirp signals c1, c2, c3, c4, . . . , cn. In the example illustrated in FIG. 3, several sub frames are included, such as sub frame 1, sub frame 2, . . . , sub frame N, and make up one frame. In other words, the one frame illustrated in FIG. 3 consists of N sub frames. The one frame illustrated in FIG. 3 may be frame 1, and may be followed by frame 2, frame 3, . . . , and so on. Each of these frames may consist of N sub frames, similarly to frame 1. A frame interval of a prescribed length may be included between the frames. The one frame illustrated in FIG. 3 may have a length of around 30 to 50 milliseconds, for example.

In the electronic device 1 according to the embodiment, the signal generation processor 11 may generate a transmission signal having a suitable number of frames. In FIG. 3, illustration of some of the chirp signals is omitted. Thus, the relationship between the time and frequency of the transmission signal generated by signal generation processor 11 may be stored, for example, in a storage unit of the signal processor 10.

Thus, the electronic device 1 according to the embodiment may transmit a transmission signal consisting of a sub frame containing multiple chirp signals. The electronic device 1 according to the embodiment may transmit a transmission signal consisting of a frame containing a prescribed number of sub frames.

Hereafter, the electronic device 1 will be described as transmitting a transmission signal having the frame structure illustrated in FIG. 3. However, the frame structure illustrated in FIG. 3 is merely an example and, for example, the number of chirp signals included in one sub frame may be set as appropriate. In other words, in the embodiment, the signal generation processor 11 may generate a sub frame containing a suitable number (for example, a suitable plurality of) chirp signals. The sub frame structure illustrated in FIG. 3 is also merely an example and the number of sub frames included in one frame may be set as appropriate. In other words, in the embodiment, the signal generation processor 11 may generate a frame containing a suitable number (for example, a suitable plurality of) sub frames. The signal generation processor 11 may generate signals having different frequencies. The signal generation processor 11 may generate multiple discrete signals of bandwidths having different frequencies f.

Figure 4:
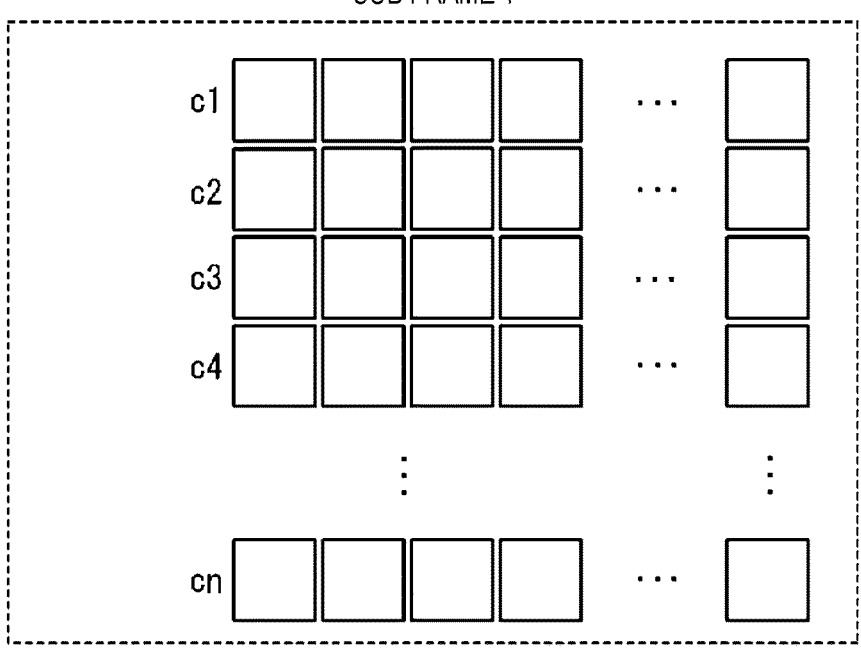
FIG. 4 is a diagram for describing processing of a signal performed by the electronic device according to the embodiment.
Figure 4:
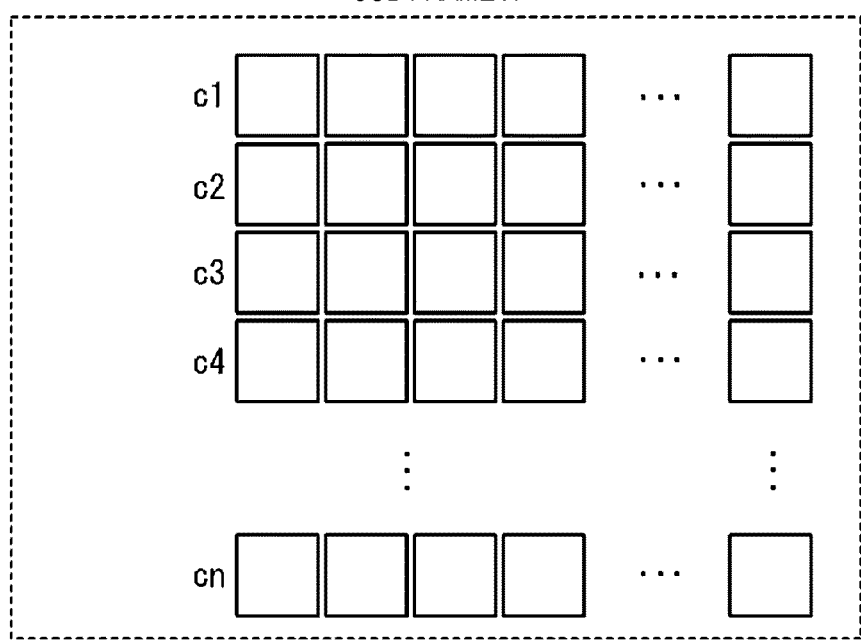

FIG. 4 is a diagram illustrating part of the sub frames in FIG. 3 in a different manner. FIG. 4 illustrates samples of a reception signal resulting from reception of the transmission signal illustrated in FIG. 3 obtained by performing a two-dimensional fast Fourier transform (2D-FFT). The 2D-FFT is a process performed in the reception signal processor 12 (FIG. 2) of the signal processor 10.

As illustrated in FIG. 4, the chirp signals c1, c2, c3, c4, . . . , cn are stored in the individual sub frames, i.e., sub frame 1, . . . , sub frame N. In FIG. 4, the chirp signals c1, c2, c3, c4, . . . , cn each consist of samples represented by a horizontally arrayed row of squares. The reception signal illustrated in FIG. 4 is subjected to 2D-FFT, CFAR, and integrated signal processing for each sub frame in the reception signal processor 12 illustrated in FIG. 2.

Figure 5:
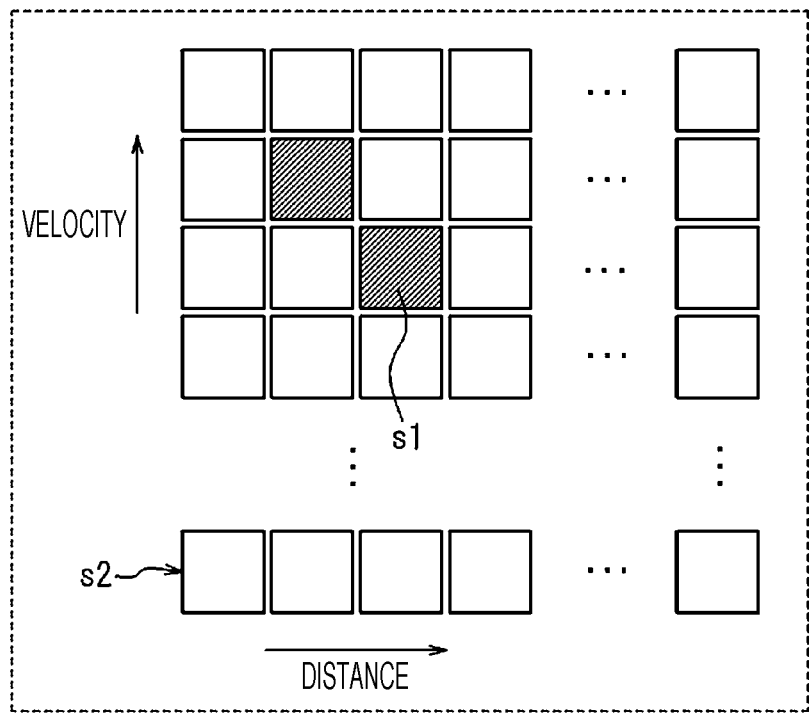
FIG. 5 is a diagram for describing processing of a signal performed by the electronic device according to the embodiment.

FIG. 5 illustrates an example of a point group on a range-Doppler (distance-velocity) plane calculated by performing 2D-FFT, CFAR, and integrated signal processing of each sub frame in the reception signal processor 12 illustrated in FIG. 2.

In FIG. 5, the horizontal direction represents range (distance) and the vertical direction represents velocity. A shaded point group s1, illustrated in FIG. 5, is a group of points representing a signal that exceeds the CFAR threshold process. An unshaded point group s2, illustrated in FIG. 5, illustrates a bin (2D-FFT sample) that did not exceed the CFAR threshold and does not have point group. For the point groups on the range-Doppler plane calculated in FIG. 5, the direction from the radar is calculated by direction estimation, and the position and velocity on a 2D plane are calculated as a point group representing the object 200. Here, the direction estimation may be calculated using beamformers and/or subspace methods. Examples of typical subspace method algorithms include multiple signal classification (MUSIC) and estimation of signal parameters via rotation invariance technique (ESPRIT).

Figure 6:
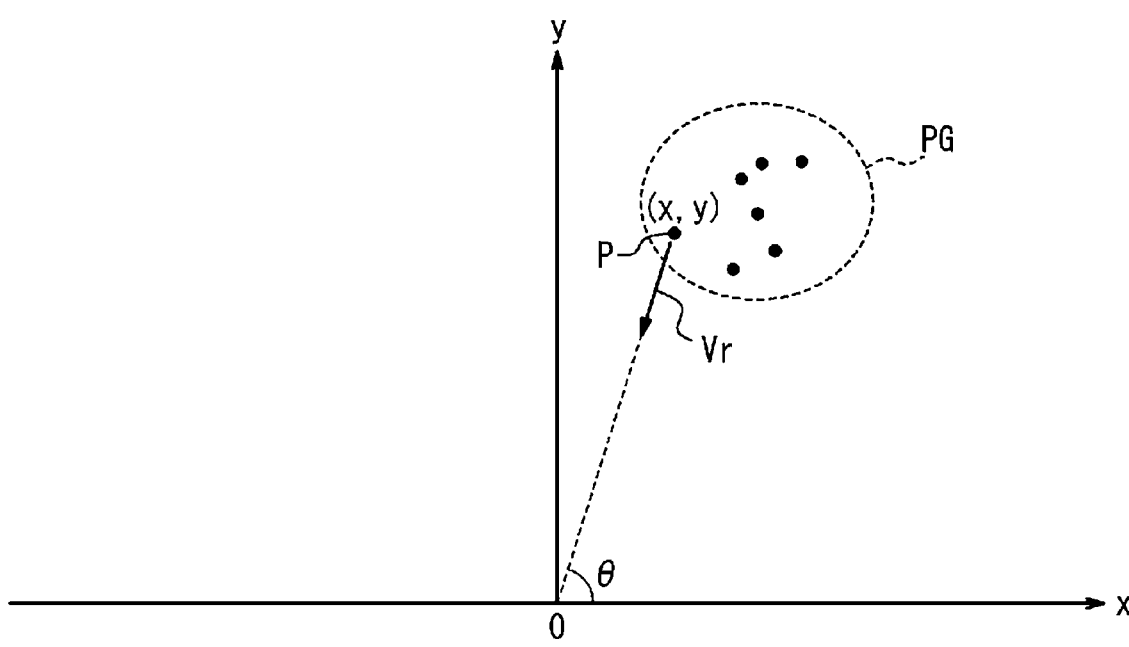
FIG. 6 is a diagram for describing processing of a signal performed by the electronic device according to the embodiment.

FIG. 6 illustrates an example of results obtained by the reception signal processor 12 transforming the point group coordinates from the range-Doppler plane illustrated in FIG. 5 to the XY plane after the direction estimation. As illustrated in FIG. 6, the reception signal processor 12 is able to plot a point group PG on the XY plane. The point group PG is made up of individual points P. Each point P has an angle θ and a radial velocity Vr in polar coordinates.

The reception signal processor 12 detects an object present in the range where a transmission wave T was transmitted based on at least one out of the 2D-FFT and angle estimation results. The reception signal processor 12 may perform object detection by performing clustering processing, for example, based on the estimated distance information, velocity information, and angle information. For example, density-based spatial clustering of applications with noise (DBSCAN) is a well-known algorithm used for clustering of data. This is an algorithm for performing clustering based on density. In the clustering processing, for example, the average power of points making up the detected object may be calculated. The distance information, velocity information, angle information, and power information of the object detected in the reception signal processor 12 may be supplied to the controller 50, for example. In this case, if the mobile object 100 is an automobile, communication may be performed through the communication interface 13 such as a controller area network (CAN), for example.

As described above, the electronic device 1 may include the transmission antenna 24, the reception antenna 31, and the reception signal processor 10. The transmission antenna 24 transmits the transmission wave T. The reception antenna 31 receives a reflection wave R resulting from reflection of the transmission wave T. The signal processor 10 detects an object (for example, the object 200) that reflects the transmission wave T based on a transmission signal transmitted as the transmission wave T and a reception signal received as the reflection wave R.

Clustering Performed By Electronic Device According to Embodiment

Next, in describing operation of the electronic device 1 according to the embodiment, first, clustering in general radar technology will be described. In particular, clustering based on DBSCAN, which is widely used in general radar technologies and so on will be described.

DB SCAN is a well-known algorithm for clustering (grouping) data. DB SCAN is widely employed for clustering (grouping) data points detected by millimeter wave radar based on reflection waves. In DBSCAN, a parameter c is introduced and a group of points for which a distance is smaller than c are classified as belonging to the same group (cluster). Therefore, for example, if the distance between point P1 and point P2 is smaller than £, and the distance between point P2 and point P3 is also smaller than £, then point P1 and point P3 can also be classified into the same cluster. In this case, for example, even if the distance between point P1 and point P3 is greater than £, point P1 and point P3 can be classified into the same cluster because the above conditions are satisfied. Thus, for example, as a point group becomes more numerous, two points located at a considerable distance from each other may be classified into the same cluster.

Thus, in DBSCAN, points that do not actually correspond to a single object may be clustered as one single object (strictly speaking, in DBSCAN, there are attempts to deal with the above situation by taking parameters other than c into consideration). For example, in a situation where a pedestrian is standing near a wall, the wall and the pedestrian might be clustered as a single object. Hereinafter, such characteristics of DBSCAN will be described more specifically.

Figure 7:
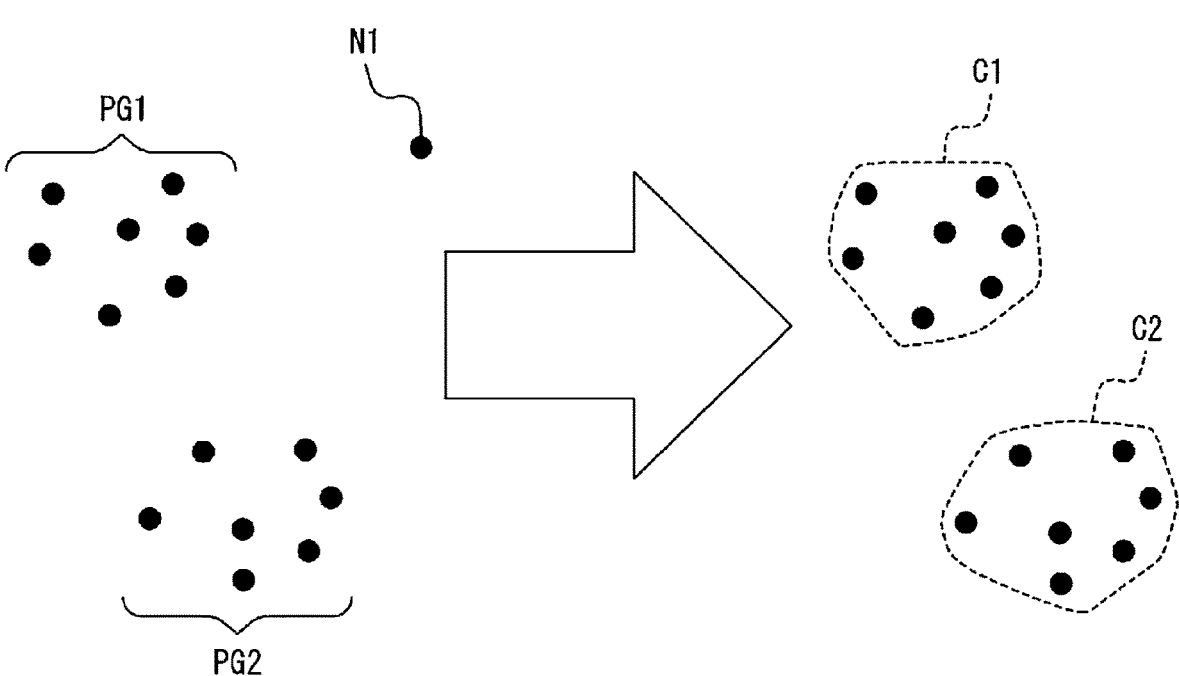
FIG. 7 is a diagram for describing an example of general clustering.

FIG. 7 is a diagram for describing an example of general clustering. The arrow illustrated in the center of FIG. 7 is supposed to conceptually represent the clustering processing based on DBSCAN. That is, the situation that exists before the DBSCAN-based clustering processing is executed is illustrated on the left side of FIG. 7. The situation that exists after the DBSCAN-based clustering processing has been executed is illustrated on the right side of FIG. 7.

As illustrated on the left side of FIG. 7, for example, a situation is assumed in which point groups have been obtained based on a radar reception signal before clustering processing. As illustrated in FIG. 7, a first point group PG1 and a second point group PG2 and another point N1 are assumed to have been obtained before the clustering processing. In this situation, clustering processing based on DB SCAN is assumed to be performed. In this case, the first point group PG1, the points of which are relatively close to each other (distances are less than ε), are classified into a first cluster C1. The second point group PG2, the points of which are relatively close to each other (distances are less than ε), are classified into a second cluster C2. The other point N1, which is relatively far away from the other point groups (distance is greater than ε), is regarded as noise and not classified into either the first cluster C1 or the second cluster C2.

Figure 8:
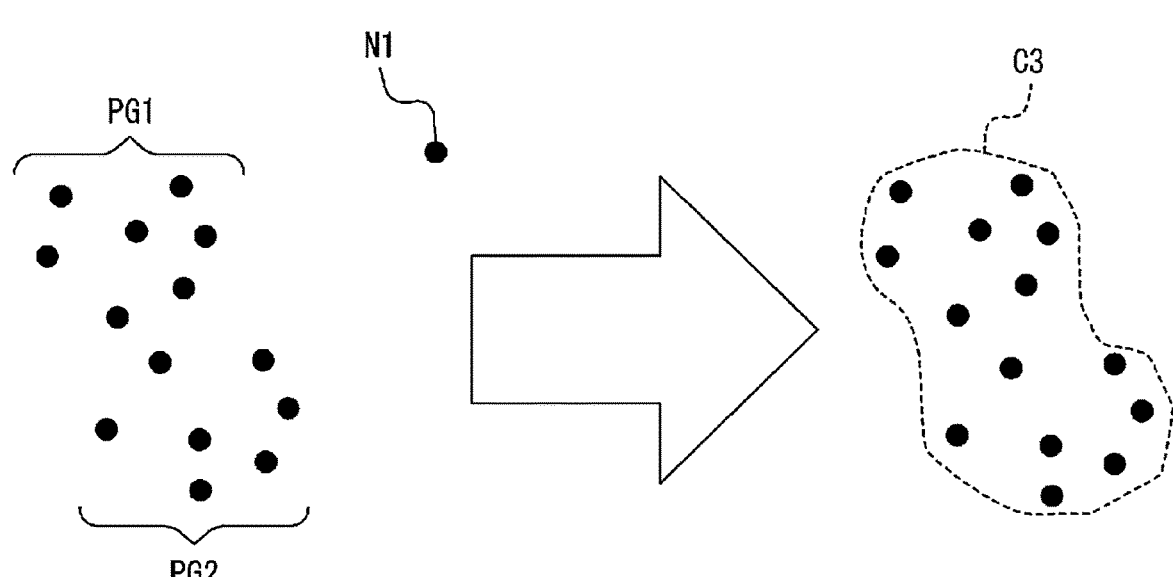
FIG. 8 is a diagram for describing an example of general clustering. A diagram for describing an example of operation of the electronic device according to the embodiment.

FIG. 8 is a diagram for describing another example of general clustering. The meaning of the symbols in FIG. 8 are substantially the same as those in FIG. 7.

As illustrated on the left side of FIG. 8, for example, a situation is assumed in which point groups have been obtained based on a radar reception signal before clustering processing. As illustrated in FIG. 8, a first point group PG1 and a second point group PG2 and another point N1 are assumed to have been obtained before the clustering processing. In FIG. 8, the first point group PG1 and the second point group PG2 are closer to each other than in the situation illustrated in FIG. 7. In this situation, clustering processing based on DBSCAN is assumed to be performed. In this case, as illustrated in FIG. 8, the first point group PG1 and second point group PG2 can be classified as the same cluster C3 because the points of these groups are relatively close to each other (distances are less than ε). If the first point group PG1 and second point group PG2 are point groups representing a single object, then proper clustering has been performed and there is no problem. However, if the first point group PG1 and the second point group PG2 are point groups representing different objects, as illustrated in FIG. 7, this means that proper clustering has not been performed, which may cause inconveniences.

Therefore, the electronic device 1 according to the embodiment does not perform clustering uniformly across the entire area, but rather, for example, classifies point groups in accordance with a prescribed parameter and performs clustering for each of the classified point groups. This operation will be further described below.

In the embodiment, the electronic device 1 classifies the point groups in accordance with a prescribed parameter before performing clustering on the point groups obtained based on a reception signal. The prescribed parameter may be, for example, "distance" in a prescribed direction.

Figure 9:
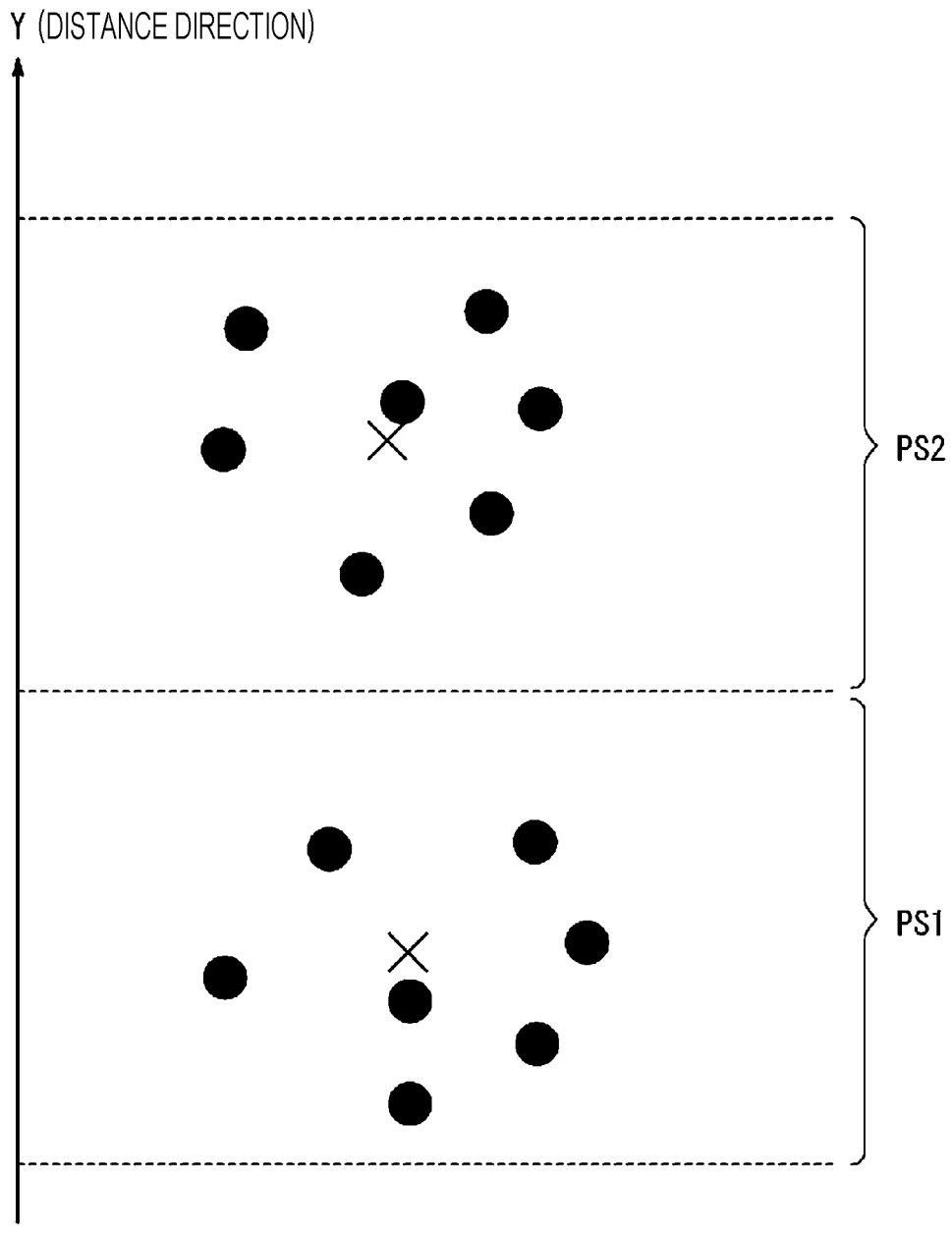
FIG. 9 is a diagram for describing an example of operation of the electronic device according to the embodiment.

For example, suppose that the point groups illustrated in FIG. 9 are obtained in the electronic device 1 based on a reception signal. For example, as illustrated in FIG. 9, suppose there are multiple data points having x, y coordinates from a prescribed reference point on a plane (i.e., a distance x from the reference point and a distance y from the reference point). When the electronic device 1 according to the embodiment is a millimeter wave radar, the (x, y) values detected based on reflection waves reflected from various objects with the electronic device 1 serving as the reference point may be considered to correspond to the above data points. In FIG. 9, the vertical axis represents a distance Y from the electronic device 1. The distance Y may be defined as a distance in front of the electronic device 1 (mobile object 100), similarly to the coordinates illustrated in FIG. 1.

Next, the electronic device 1 classifies the point groups illustrated in FIG. 9 in accordance with the prescribed parameter. For example, in the direction of the distance Y, the point groups may be classified in accordance with the distance parameter Y, from 0 m to 10 m, from 10 m to 20 m, from 20 m to 30 m, . . . , and so on, up to a maximum value y. More specifically, the electronic device 1 may classify the point groups illustrated in FIG. 9, for example, into a section PS1 from 0 m to 10 m, a section PS2 from 10 m to 20 m, a section PS3 from 20 m to 30 m, . . . and so on. The point groups illustrated in FIG. 9 are illustrated as being classified only into the section PS1 and the section PS2, but the point groups may also be classified into a section PS3 and further sections.

Here, in the above example, the point groups were classified into 10-meter units in accordance with the distance parameter Y. However, the point groups may instead be classified into other units such as 8 or 12 meters. In FIG. 9, a situation is assumed in which the electronic device 1 is a radar sensor installed in the mobile object (automobile) 100 as illustrated in FIG. 1 as an example. For example, automobiles in the opposite lane or vehicles traveling in front, ranging from regular automobiles to trucks, are assumed to have an approximate total length of not more than 10 meters. Therefore, in accordance with the distance parameter Y in the electronic device 1 according to the embodiment, the point groups may be classified as 10-meter units. However, in other applications, the electronic device 1 according to the embodiment may classify the point groups using other units. For example, the electronic device 1 according to the embodiment may determine the units to be used for classifying the point groups in accordance with the size (for example, total length) of the objects to be detected.

As illustrated in FIG. 9, once the point groups have been classified in accordance with the prescribed parameter, for example, the electronic device 1 performs clustering on each of the classified point groups. For example, in FIG. 9, the electronic device 1 may perform clustering on each of the point group classified into the section PS1 and the point group classified into the section PS2.

Figure 10:
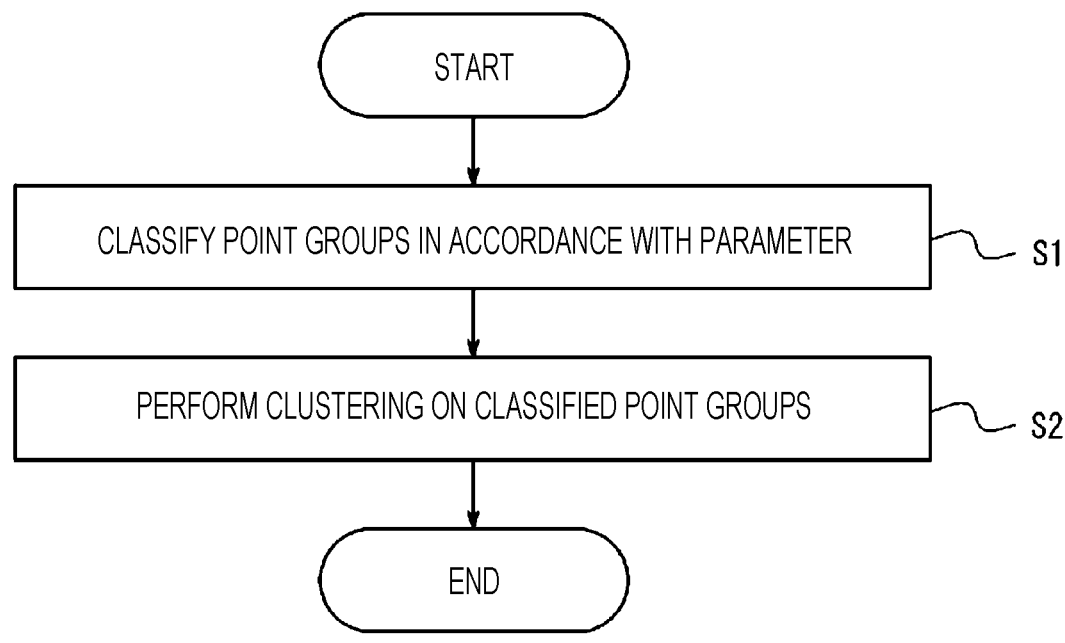
FIG. 10 is a flowchart for describing operation of the electronic device according to the embodiment.

FIG. 10 is a flowchart for describing operation of the electronic device 1 according to the embodiment. FIG. 10 illustrates an example of the operation of the electronic device 1 described above. The operation illustrated in FIG. 10 may begin when point groups are obtained based on the reception signal in the electronic device 1. The operation illustrated in FIG. 10 may be performed in the signal processor 10 of the electronic device 1 according to the embodiment, more specifically, in the reception signal processor 12 of the signal processor 10.

Once the operation illustrated in FIG. 10 begins, the reception signal processor 12 classifies the obtained point groups in accordance with a prescribed parameter (Step S1). Once the point groups have been classified in Step S1, the reception signal processor 12 performs clustering on each of the classified point groups (Step S2).

Thus, in the electronic device 1 according to the embodiment, the signal processor 10 may classify the point groups representing an object in accordance with a prescribed parameter when performing clustering on the results of object detection. In this case, the signal processor 10 may classify the point group representing the object into prescribed units, for example, units of 10 meters.

In this way, points that do not actually belong to a single object can be distinguished from each other and detected without being detected as a single object. For example, according to the electronic device 1, walls and pedestrians can be clustered separately from each other, even in a situation such as where a pedestrian is standing near a wall. Therefore, according to the electronic device 1 of the embodiment, a prescribed object can be well detected by receiving the reflection wave generated by the transmitted transmission wave being reflected by the object.

In the embodiment described above, the parameter of the "distance" in the Y-axis direction is employed in classifying the point groups in accordance with a prescribed parameter. However, in an embodiment, parameters that can be employed in classifying point groups in accordance with prescribed parameters are not limited to distance. For example, the electronic device 1 according to the embodiment may classify point groups in accordance with various parameters that reflect prescribed physical properties of the objects, such as velocity, angle, weight, and so on, rather than distance. In this case as well, the electronic device 1 according to the embodiment may perform clustering for each of the classified point groups.

In an embodiment, when the point groups are classified in accordance with the parameter of distance, for example, the point groups may be classified in accordance with the parameter of a difference in distance. In this case, the "distance" may be a Euclidean distance, a Mahalanobis distance, and so on. In an embodiment, when the point groups are classified in accordance with the parameter of velocity, for example, the point groups may be classified in accordance with the parameter of a difference in velocity. In an embodiment, when the point groups are classified in accordance with the parameter of angle, for example, the point groups may be classified in accordance with the parameter of a difference in angle.

In the embodiment described above, a parameter such as the distance in a prescribed direction with respect to Cartesian coordinates $(x, y)$ was employed to classify point groups in accordance with a prescribed parameter. However, in an embodiment, a parameter such as distance in a prescribed direction with respect to polar coordinates $(r, \theta)$ may be employed to classify point groups in accordance with a prescribed parameter.

Correction of Clustering Performed By Electronic Device According to Embodiment Next, correction of the above-described embodiment will be further described.

According to the electronic device 1 of the above-described embodiment, the risk of detecting objects that are not actually a single object as a single object can be reduced. On the other hand, according to the above-described embodiment, objects that are actually a single object may be possibly detected as different objects.

Figure 11:
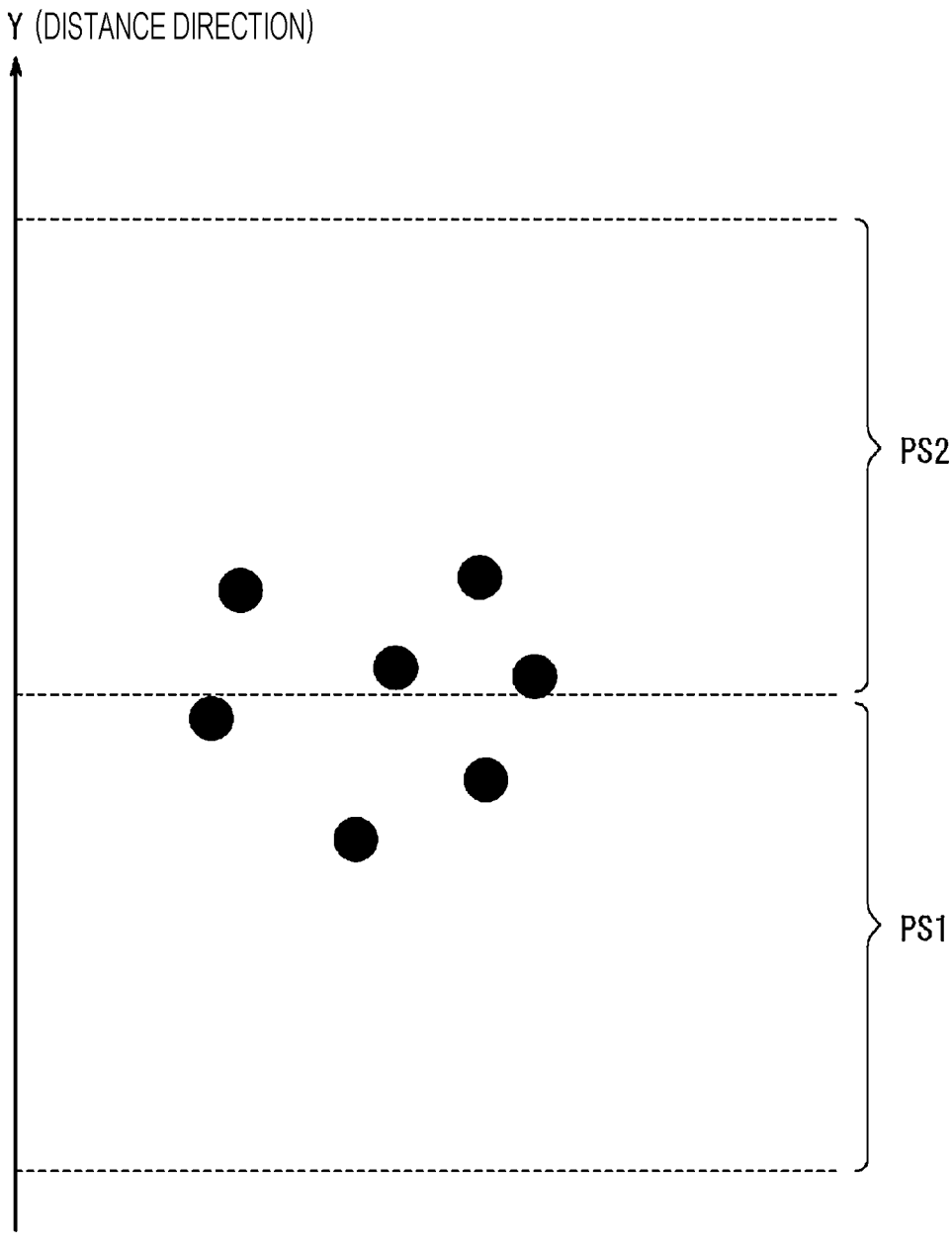
FIG. 11 is a diagram illustrating an example of operation of the electronic device according to the embodiment.

For example, suppose that the point group illustrated in FIG. 11 is obtained in the electronic device 1 based on the reception signal. In this case, similarly to as described above, a case where classification is performed with the section PS1 being from 0 m to 10 m, the section PS2 being from 10 m to 20 m, . . . and so on will be considered.

In this case, the electronic device 1 may perform clustering on each of the point group classified into the section PS1 and the point group classified into the section PS2. Therefore, the electronic device 1 detects the point groups illustrated in FIG. 11 as two separate objects. If the point group classified into section PS1 and the point group classified into section PS2 are point groups representing different objects, then proper clustering has been performed and there is no problem. However, if the point group classified into section PS1 and the point groups classified into section PS2 are point groups representing a single object, then proper clustering has not been performed, which may cause inconveniences.

Therefore, in the electronic device 1 according to the embodiment, the operation illustrated in FIG. 10 may be followed by correction performed as necessary. This operation will be further described below.

Figure 12:
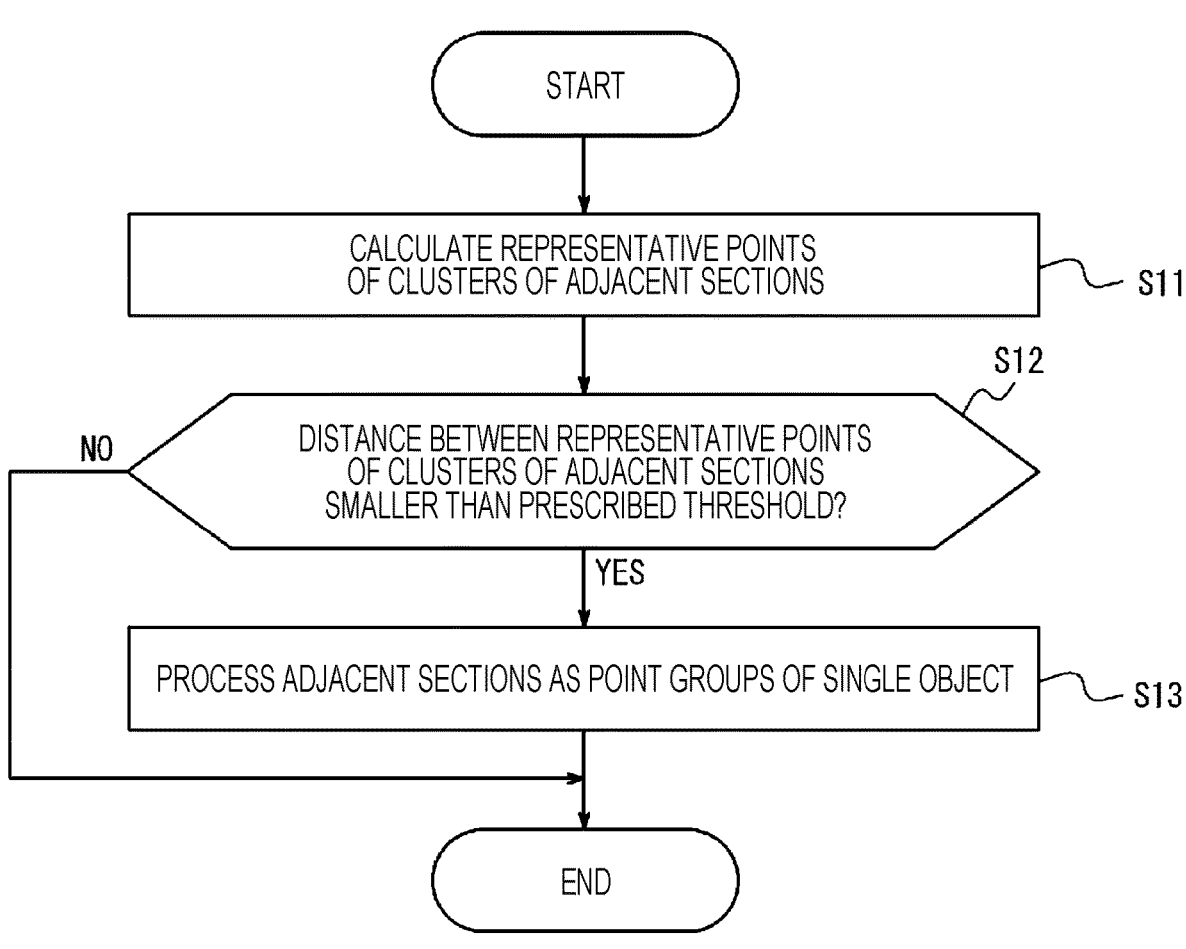
FIG. 12 is a flowchart for describing operation of the electronic device according to the embodiment.

FIG. 12 is a flowchart for describing a correction operation of the electronic device 1 according to the embodiment. The operation illustrated in FIG. 12 may be performed immediately after the operation illustrated in FIG. 10.

When the operation illustrated in FIG. 12 begins, the reception signal processor 12 calculates representative points of clusters of adjacent sections among sections of the point groups (Step S11). The sections of the point groups in Step S11 may be sections of the point groups classified in Step S1 in FIG. 10. In the present disclosure, a representative point of a cluster may be a representative point of a clustered point group.

For example, the section PS1 and the section PS2 illustrated in FIG. 9 may be "adjacent sections" in Step S11. A representative point calculated in Step S11 may be a single point if the clustered point group (cluster) consists of only one point. If the clustered point group (cluster) consists of multiple points, the representative point calculated in Step S11 may be a point based on the average value, median value, or the like in a prescribed direction. For example, if the clustered point group consists of multiple points, the reception signal processor 12 may calculate a representative point using the average of the X coordinates of the multiple points as the X coordinate and using the average of the Y coordinates of the multiple points as the Y coordinate. For example, if the point group consists of multiple points, the reception signal processor 12 may calculate a representative point using the median of the X coordinates of the multiple points as the X coordinate and the median of the Y coordinates of the multiple points as the Y coordinate. As an example, the representative point of the point group of the cluster included in the section PS1 illustrated in FIG. 9 may be the point at the position marked with a cross in PS1. As an example, the representative point of the point group of the cluster included in the section PS2 illustrated in FIG. 9 may be the point at the position marked with a cross (x) in PS2.

Thus, in an embodiment, the signal processor 10 may calculate the representative point of each clustered point group included in adjacent sections classified in accordance with a prescribed parameter based on the average or median values of the coordinates of the point groups in a prescribed direction in the adjacent sections. Here, a representative point may be a point that is only found in a cluster, which is a clustered point group, and is representative of that cluster. If a cluster is linked to one car for example, a point in the cluster may be considered a representative point in the sense that the point, which is a single point, represents the position of the car. A point group before clustering simply means points distributed across the X-Y plane, and may be assumed to not be linked a particular car or the like and not have a representative point.

After the representative points of the clusters in the adjacent sections have been calculated in Step S11, the reception signal processor 12 determines whether the distance between the representative points of the clusters in the adjacent sections is smaller than a prescribed threshold (Step S12). The prescribed threshold used in the determination in Step S12 may be set as appropriate so that objects that are actually a single object are appropriately determined to be a single object and so that actually separate objects are appropriately determined to be different objects. Here, the prescribed threshold may be set as 1 m as an example.

If the distance between the representative points of the clusters in the adjacent sections is not smaller than the prescribed threshold in Step S12, the clusters in the adjacent sections are determined to be at or more than a prescribed distance from each other. In this case, the reception signal processor 12 may skip the distance in Step S13 and finish the operation illustrated in FIG. 12. In other words, in this case, the point groups included in the adjacent sections are processed as they are (as they were classified in Step S1) as point groups of different objects.

On the other hand, if the distance between the representative points of the clusters in the adjacent sections is smaller than the prescribed threshold in Step S12, the reception signal processor 12 may process the point groups included in the adjacent sections as point groups of a single object (Step S13).

In Step S13, when the point groups in adjacent sections are processed as point groups of a single object, specifically, for example, one of the following two processes may be performed.

In other words, in Step S13, the reception signal processor 12 may recalculate the representative point while regarding the point groups included in the adjacent sections as a single point group. In Step S12 of FIG. 12, it is assumed that the reception signal processor 12 compares all the distances of the clusters based on two adjacent sections, for example, the section from 0 m to 10 m in distance and the section from 10 m to 20 m in distance. However, in Step S12 of FIG. 12, the reception signal processor 12 may compare the distances of clusters based on smaller sections. For example, the reception signal processor 12 may compare the distance between a representative point in a section from 5 m to 10 m and a representative point in the section from 10 m to 15 m.

Thus, when the distance between the representative points of the clustered point groups included in adjacent sections and classified in accordance with the prescribed parameter is smaller than the prescribed threshold, the signal processor 10 may calculate a representative point while treating the point groups included in the adjacent sections as point groups of a single object.

For example, in Step S13, the reception signal processor 12 may, for example, nullify the adjacent sections and perform the clustering processing based on DBSCAN again while treating the adjacent sections as a single section. For example, suppose that the distance between the representative points of two (or more) clusters contained in two adjacent sections, one in a section from 0 m to 10 m in distance and the other in a section from 10 m to 20 m in distance, is smaller than the prescribed threshold. In this case, the reception signal processor 12 may again perform clustering processing based on DBSCAN for a single section, for example, from 0 m to 20 m in distance.

Thus, when the distance between the representative points of the clusters contained in the adjacent sections classified in accordance with the prescribed parameter is smaller than the prescribed threshold, the signal processor 10 may cluster the point groups contained in the adjacent sections as point groups of a single object.

As described above, in an embodiment, the signal processor 10 may process the point groups included in adjacent sections classified in accordance with the prescribed parameter as point groups of a single object when the distance between the representative points of the clusters included in the adjacent sections is smaller than a prescribed threshold.

Selective Clustering Performed By Electronic Device According to Embodiment

The electronic device 1 according to the embodiment described above has been described while assuming that all the point groups obtained based on the reception signal are classified in a uniform manner in accordance with the prescribed parameter. However, the electronic device 1 according to the embodiment may selectively classify point groups obtained based on the reception signal in accordance with the prescribed parameter. This operation will be further described below.

Figure 13:
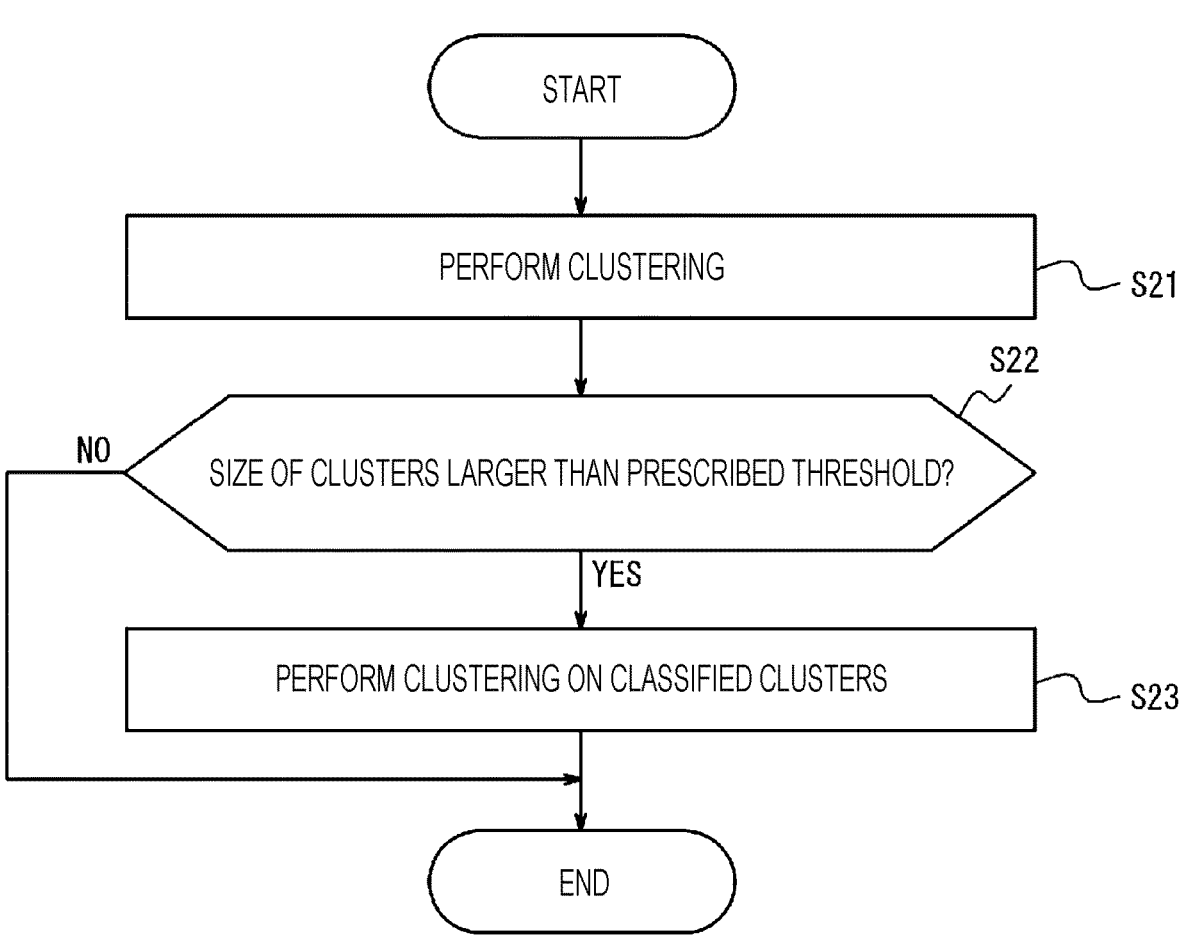
FIG. 13 is a flowchart for describing operation of the electronic device according to the embodiment.

FIG. 13 is a flowchart describing the operation of selective clustering performed by the electronic device 1 according to the embodiment. The operation illustrated in FIG. 13 may be performed instead of the operation illustrated in FIG. 10, for example. In other words, it may be assumed that point groups are obtained based on the reception signal in the electronic device 1 at the time the operation illustrated in FIG. 13 begins.

When the operation illustrated in FIG. 13 begins, the reception signal processor 12 performs clustering processing based on DBSCAN, for example, on the point groups obtained based on the reception signal (Step S21). Up to the operation in Step S21, processing substantially the same as that performed in DBSCAN-based clustering of the related art may be performed. That is, in Step S21, the reception signal processor 12 may uniformly perform clustering based on DBSCAN for all the point groups obtained based on the reception signal.

Once clustering has been performed in Step S21, the reception signal processor 12 determines whether the size of each cluster obtained by the clustering is larger than a prescribed threshold (Step S22).

The "cluster size" in Step S22 may be calculated in the following way, for example. For example, the "cluster size" in Step S22 may be determined based on an average value dm of the distances between the representative point of the cluster and the points in the cluster, as illustrated in Equation (1) below. In Step S22, the reception signal processor 12 may determine that the cluster size is larger than the prescribed threshold, for example, when the average value dm exceeds a threshold of 5 m.

[Math 1]

$$dm = \frac{1}{N}\sum_{i=1}^{N}\sqrt{(x_i - x_0)^2 + (y_i - y_0)^2} \qquad (1)$$

where N is the number of points in the cluster. In addition, $(x_0, y_0)$ represents the coordinates of the representative point of the cluster. The representative point of this cluster may be calculated as described in FIG. 9, for example. In addition, $(x_i, y_i)$ (i=1, . . . , N) represents the x coordinate and the y coordinate (distance in x direction and distance in y direction) of a point in the cluster. The size of the cluster may be determined based on, for example, the average of the points in the cluster or the median of the points in the cluster. In the present disclosure, the size of the cluster may be the size of a clustered point group.

When the cluster size is not larger than the prescribed threshold in Step S22, the reception signal processor 12 may terminate the operation illustrated in FIG. 13. On the other hand, when the cluster size is larger than the prescribed threshold in Step S22, the reception signal processor 12 may perform the processing illustrated in Step S23. In Step S23, the reception signal processor 12 may perform clustering based on DBSCAN, for example, to classify the point groups in that cluster in accordance with the prescribed parameter. Here, the reception signal processor 12 may classify the point groups in the cluster in accordance with the prescribed parameter, in the same manner as in Step S1 illustrated in FIG. 10, for example.

The "cluster size" in Step S22 may be calculated in the following way, for example. For example, the "cluster size" in Step S22 may be determined based on a maximum value dmax of the distances between the representative point of the cluster and the points in the cluster, as illustrated in Equation (2) below. In Step S22, the reception signal processor 12 may determine that the cluster size is larger than the prescribed threshold, for example, when the average value dmax exceeds a threshold of 10 m.

[Math 2]

$$d\,\text{max} = \max_{1 \le i \le N}\sqrt{(x_i - x_0)^2 + (y_i - y_0)^2} \qquad (2)$$

where N is the number of points in the cluster. In addition, $(x_0, y_0)$ represents the coordinates of the representative point of the cluster. In addition, $(x_i, y_i)$ (i=1, . . . , N) represents the x coordinate and the y coordinate (distance in x direction and distance in y direction) of a point in the cluster.

The "cluster size" in Step S22 may be calculated using another method. For example, the "cluster size" in Step S22 may be determined based on the difference between the maximum values and the minimum values of the x and y coordinates of the points in the cluster. For example, the "cluster size" in Step S22 may be determined based on the variance of the x and y coordinates of the points in the cluster.

In Step S23 illustrated in FIG. 13, the reception signal processor 12 may classify point groups from a minimum distance ymin in the y direction to a maximum distance ymax in the y direction, for example. In this case, the reception signal processor 12 may classify the point groups, for example, from ymin to ymin+10 m, from ymin+10 m to ymin+20 m, and so on. In Step S23 illustrated in FIG. 13, the reception signal processor 12 may perform clustering based on DB SCAN for the clusters classified as described above. In addition, the reception signal processor 12 may further perform clustering correction as described above after performing the clustering based on DBSCAN.

In Step S23 illustrated in FIG. 13, the reception signal processor 12 may determine the direction in which to classify each point group in accordance with the direction of the cluster size, for example. In this case, the reception signal processor 12 may calculate the difference between the maximum values and the minimum values of the distances in the x and y directions of the points in that cluster. For example, if the maximum value in the x direction of a point in the cluster is denoted as xmax and the minimum value as xmin, the difference between the maximum and minimum distance in the x direction, Δx, is xmax−xmin. If the maximum value in the y direction of the point in the cluster is denoted as ymax and the minimum value as ymin, the difference between the maximum value and the minimum value of the distance in the y direction, Δy, is ymax−ymin. Here, the reception signal processor 12 may classify the point groups in the x-direction and perform clustering based on DB SCAN for each of the classified clusters when Δx>Δy. On the other hand, the reception signal processor 12 may, for example, classify the point groups in the y direction when Δx<Δy, and perform clustering based on DB SCAN for each of the classified clusters.

As described above, in an embodiment, the signal processor 10 may selectively classify point groups representing objects in accordance with a prescribed parameter. In this case, the signal processor 10 may selectively classify point groups representing objects in accordance with the prescribed parameter when the size of the clusters obtained through clustering is greater than or equal to a prescribed threshold.

Dimensions of Clustering Performed By Electronic
Device According to Embodiment

As illustrated in FIG. 9, for example, in the embodiment
described above, the reception signal processor 12 classifies
the point groups in the Y direction or the X direction, i.e., the
point groups are classified in one dimension. However, the
reception signal processor 12 may classify the point groups
in two or more dimensions, for example. For example, the
reception signal processor 12 may classify the point groups
in the x-direction and the y-direction (and the z-direction
may also be included). In this case, the reception signal
processor 12 may perform clustering based on DBSCAN in
two or more dimensions for each of the sections classified in
two or more dimensions.

The present disclosure has been described based on the
drawings and examples, but note that a variety of variations
and amendments may be easily made by one skilled in the
art based on the present disclosure. Therefore, note that such
variations and amendments are included within the scope of
the present disclosure. For example, the functions included
in each functional part can be rearranged in a logically
consistent manner. Multiple functional parts and so forth
may be combined into a single part or divided into multiple
parts. Further, each embodiment according to the present
disclosure described above does not need to be implemented
exactly as described in the embodiment, and may be imple-
mented with features having been combined or omitted as
appropriate. A variety of variations and amendments to the
content of the present disclosure can be made by one skilled
in the art based on the present disclosure. Accordingly, such
variations and amendments are included in the scope of the
present disclosure. For example, in each embodiment, each
functional part, each means, each step and so on can be
added to other embodiments so long as there are no logical
inconsistencies, or can be replaced with each functional part,
each means, each step, and so on of other embodiments. In
each embodiment, a plurality of each functional part, each
means, each step, and so on can be combined into a single
functional part, means, or step or divided into multiple
functional parts, means, or steps. Each of the above-de-
scribed embodiments of the present disclosure is not limited
to faithful implementation of each of the described embodi-
ments, and may be implemented by combining or omitting
some of the features as appropriate.

The above-described embodiment is not limited to only
being implemented as the electronic device 1. For example,
the embodiment described above may be implemented as a
method of controlling a device such as the electronic device
1. For example, the embodiment described above may be
implemented as a program executed by a device such as the
electronic device 1.

REFERENCE SIGNS 1 electronic device
10 signal processor
11 signal generation processor
12 reception signal processor
13 communication interface
21 transmission DAC
22 transmission circuit
23 millimeter wave transmission circuit
24 transmission antenna array
31 reception antenna array
32 mixer
33 reception circuit 34 reception ADC
50 controller
The invention claimed is:
1. An electronic device comprising:
a transmission antenna configured to transmit a transmis-
sion wave;
a reception antenna configured to receive a reflection
wave resulting from reflection of the transmission
wave; and
a signal processor configured to determine a plurality of
data points based on a transmission signal transmitted
as the transmission wave and a reception signal
received as the reflection wave, classify the plurality of
data points into at least a first point group of first data
points and a second point group of second data points
in accordance with a prescribed parameter, perform
clustering on the first data points of the first point group
and clustering on the second data points of the second
point group, and detect a first object based on clustering
the first data points of the first point group and detect
a second object based on a second clustering the second
data points of the second point group,
wherein when a distance between a first representative
point of the first point group and a second representa-
tive point of the second point group included in adja-
cent sections and classified in accordance with the
prescribed parameter is smaller than a prescribed
threshold, the signal processor processes first point
group and the second point group as point groups of a
single object.
2. The electronic device according to claim 1, wherein the
signal processor classifies the first point group in accordance
with a first range of the prescribed parameter and classifies
the second point group in accordance with a second range of
the prescribed parameter.
3. The electronic device according to claim 2, wherein the
first range and the second range are based on a size of an
object to be detected by the electronic device.
4. The electronic device according to claim 1, wherein
when the distance is smaller than the prescribed threshold,
the signal processor calculates a representative point while
treating the first point group and the second point group as
point groups of a single object.
5. The electronic device according to claim 1, wherein
when the distance is smaller than the prescribed threshold,
the signal processor performs clustering while treating the
first point group and the second point group as point groups
of a single object.
6. The electronic device according to claim 1, wherein the
signal processor calculates the first representative point and
the second representative point based on an average value or
a median value of coordinates in a prescribed direction of the
first point group and the second point group included in the
adjacent sections.
7. The electronic device according to claim 1, wherein the
signal processor selectively classifies the plurality of data
points in accordance with the prescribed parameter.
8. The electronic device according to claim 7, wherein the
signal processor selectively classifies the plurality of data
points in accordance with the prescribed parameter based on
a size of a clustered point group.
9. The electronic device according to claim 7, wherein the
signal processor determines a direction in which the clus-
tered point group is classified in accordance with a direction
of a size of the clustered point group.
10. The electronic device according to claim 8, wherein
the signal processor determines the size of the clustered point group based on an average value or a maximum value of distances between a representative point of the clustered point group and points within the clustered point group.

11. The electronic device according to claim 1, wherein the signal processor classifies the plurality of data points in multiple dimensions in accordance with the prescribed parameter.

12. A method for controlling an electronic device, the method comprising:

transmitting a transmission wave using a transmission antenna;

receiving a reflection wave generated by reflection of the transmission wave using a reception antenna;

determining a plurality of data points based on a transmission signal transmitted as the transmission wave and a reception signal received as the reflection wave;

classifying the plurality of data points into at least a first point group of first data points and a second point group of second data points in accordance with a prescribed parameter;

clustering the first data points of the first point group and clustering the second data points of the second point group;

detecting a first object based on clustering the first data points of the first point group and detecting a second object based on a second clustering the second data points of the second point group; and when a distance between a first representative point of the first point group and a second representative point of the second point group included in adjacent sections and classified in accordance with the prescribed parameter is smaller than a prescribed threshold, processing first point group and the second point group as point groups of a single object.

13. A non-transitory computer-readable recording medium storing computer program instructions, which when executed by a computer, cause the computer to:

transmit a transmission wave using a transmission antenna;

receive a reflection wave generated by reflection of the transmission wave using a reception antenna;

determine a plurality of data points based on a transmission signal transmitted as the transmission wave and a reception signal received as the reflection wave;

classify the plurality of data points into at least a first point group of first data points and a second point group of second data points in accordance with a prescribed parameter;

cluster the first data points of the first point group and cluster the second data points of the second point group;

detect a first object based on clustering the first data points of the first point group and detect a second object based on a second clustering the second data points of the second point group; and when a distance between a first representative point of the first point group and a second representative point of the second point group included in adjacent sections and classified in accordance with the prescribed parameter is smaller than a prescribed threshold, process first point group and the second point group as point groups of a single object.

\* \* \* \* \*